Feb. 17, 1970  L. D. RIGSBY  3,495,730
FORK LIFT MEANS FOR PALLET TRUCKS
Filed Aug. 29, 1968  2 Sheets-Sheet 1
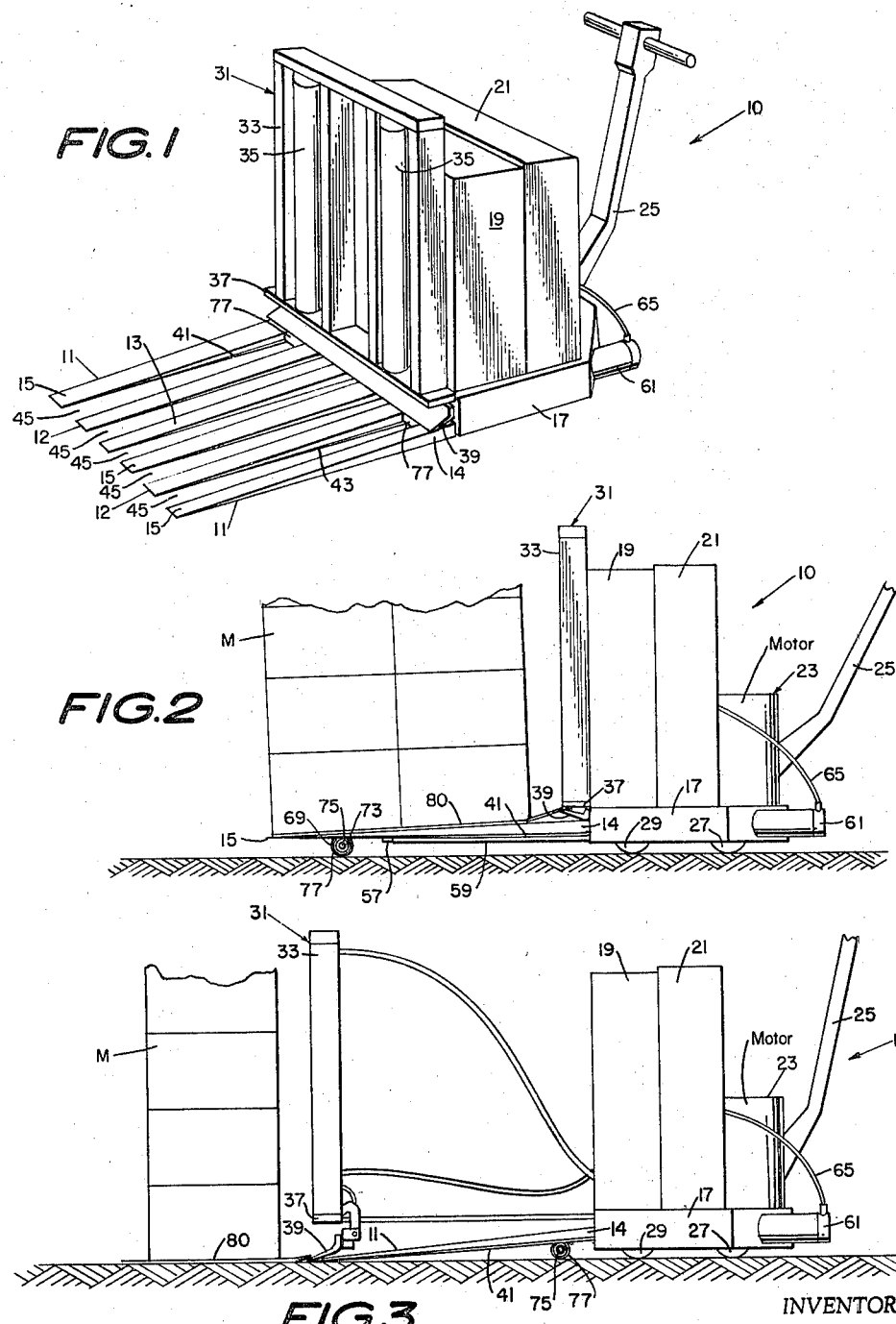
INVENTOR,
LONNIE D. RIGSBY Feb. 17, 1970
L. D. RIGSBY
3,495,730
FORK LIFT MEANS FOR PALLET TRUCKS
Filed Aug. 29, 1968
2 Sheets-Sheet 2
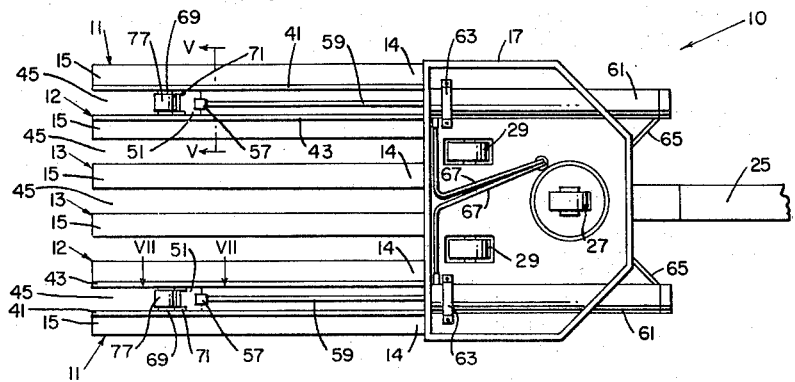
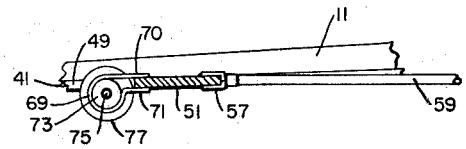
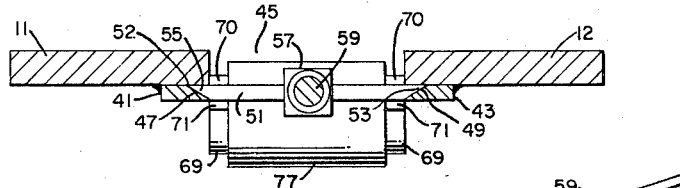
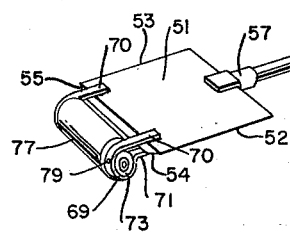
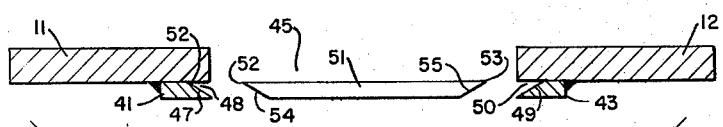
INVENTOR,
LONNIE D. RIGSBY
BY Weatherford & Weatherford
attys

United States Patent Office

3,495,730
Patented Feb. 17, 1970

3,495,730
FORK LIFT MEANS FOR PALLET TRUCKS
Lonnie D. Rigsby, 1012 Isabelle St.,
Memphis, Tenn. 38122
Filed Aug. 29, 1968, Ser. No. 756,117
Int. Cl. B66f 9/16, 9/19
U.S. Cl. 214—505                    10 Claims

ABSTRACT OF THE DISCLOSURE

A pallet truck for use in warehouses and the like, having rollers suspended from the fork members of the pallet, which are shiftable under the influence of power means such as hydraulic cylinder and piston assemblies, to and from an extended position near the forward tips of the fork members, in the extended position lifting the fork members to an elevated position out of floor or surface contact, distributing the weight of materials on the fork members and facilitating movement of a loaded truck from place to place.

BACKGROUND OF THE INVENTION

Field of the invention

The present invention relates to devices adapted for raising the fork members of a pallet truck somewhat above ground level and more particularly to slidably supported roller means for lifting and supporting the fork members of a pallet truck.

The present invention further relates to roller means interposed between the fork members of a pallet truck adapted for lifting the fork members from ground contact after loading containerized materials upon the fork members of the pallet truck and utilizing the roller means in combination with the conventional wheel means of the pallet truck for transporting the loaded pallet truck to a selected location.

Description of the prior art

There have been prior devices adapted for lifting pallet truck fork members, but these prior devices have been attached to eccentrics and bell cranks mounted in apertures formed within the fork members and have been limited in their movement to substantially vertical motion. These prior devices have further, by their placement within the periphery of the pallet truck fork members, weakened the structure of the fork members to increase the susceptibility of the fork members to breakdown under load lifting stresses.

A search of the prior art disclosed the following references: 2,628,734, Jannson, Feb. 17, 1953; 3,019,930, Allen, Feb. 6, 1962; 3,072,418, Becker, Jan. 8, 1963; 3,166,139, Ulinski, Jan. 19, 1965; 3,202,233, Dolphin et al., Aug. 24, 1965; 3,363,697, Martin et al., Nov. 21, 1967.

The field of the search was:
Class 214, Subclasses 731 and 750.
Class 254, Subclass 2.
Class 280, Subclass 43.2.

SUMMARY OF THE INVENTION

The present invention relates to means for lifting pallet truck fork members upwardly out of ground contact, and more particularly to roller means for lifting stacked materials from ground level upon the fork members of a pallet truck, to transport the materials on the fork members by means of the roller means in combination with the wheels of the pallet truck to a selected destination for unloading.

The present invention further relates to roller means mounted between selected fork members of a pallet truck with the roller means attached to a plate slidably disposed in guides attached to the fork members of the pallet truck to provide means for lifting the fork members above ground level by tilting upwardly the forward tips of the fork members, enhancing the mobility of the pallet truck when the rollers are extended toward the tips of the fork members.

OBJECTS

The principal object of the present invention is to provide a pallet truck with means for lifting the fork members thereof above ground level.

Another object of the present invention is to provide fork lifting means for a pallet truck comprising roller means slidably mounted between the fork members.

A further object of the present invention is to provide slidable roller means for pallet truck fork members actuated by hydraulic means.

Another object of the present invention is to provide the fork members of a pallet truck with guide means to support therebetween a slidably mounted plate carried thereby, and Another object of the present invention is to generally improve the design, construction and efficiency of lift means for fork members of pallet trucks.

DESCRIPTION OF THE DRAWINGS

The means by which the foregoing and other objects of the present invention are accomplished and the manner of their accomplishment will be readily understood upon reference to the accompanying drawings, in which:

FIG. 1 is a perspective view of a pallet truck embodying the present invention.

FIG. 2 is a side elevational view of the pallet truck of FIG. 1 with the present invention in extended position, and the fork members out of ground or surface contact.

FIG. 3 is a side elevational view of the pallet truck of FIG. 1 with the present invention in retracted position, and the fork members in surface contact.

FIG. 4 is an inverted plan view of the pallet truck of FIG. 1.

FIG. 5 is an enlarged fragmentary cross-sectional view taken on the line V—V of FIG. 4.

FIG. 6 is a fragmentary exploded sectional view similar to FIG. 5, with parts removed for purposes of illustration.

FIG. 7 is a fragmentary cross-sectional view taken on the line VII—VII of FIG. 4, enlarged to a scale less than that of FIG. 5; and FIG. 8 is an enlarged fragmentary perspective view of the roller means and related parts on the scale of FIG. 7.

DESCRIPTION OF THE PREFERRED EMBODIMENT

Referring now to the drawings in which the various parts are indicated by numerals, the present invention relates to a conventional pallet truck 10 having a plurality of fork members, including outermost fork members 11, fork members 12 inwardly next adjacent to fork members 11, and central fork members 13 positioned between fork members 12, all fork members being attached to the lowermost frontal portion of the base skirt 17 of truck 10, fork members 11, 12, 13 extending forwardly from the truck.

Pallet truck 10 further includes a conventional battery housing 19, a storage portion 21 for housing compression and hydraulic means, a steering bar and control column 25, a driving wheel 27 and a pair of support wheels 29. Pallet truck 10 additionally includes a material grabbing means 31, comprising a frame portion 33, a pair of hydraulic cylinders 35, an upper movable jaw member 37 and a lower fixed jaw member 39, the upper movable jaw member 37 being actuated by the cylinders 35.

Each fork member 11, 12, 13 is uniformly tapered forwardly away from pallet truck 10, in a substantially elongated chisel-like shape in which the rear ends 14 of the fork members adjacent the truck are thick compared to the remainder of the length of the fork members, and, from such rear ends 14, the thickness of fork members 11, 12, 13 reduces to thin front tips or ends 15, remote from the truck. The lower or under surfaces of front tips 15 are normally in ground contact (see FIG. 3) for initial entry of fork members 11, 12, 13 beneath material to be handled, such as the material M. Rear ends 14 of fork members 11, 12, 13 are spaced above ground level, and the upper surfaces of the fork members are thus normally forwardly sloped downwardly. Fork members 11, 12, 13 are substantially equal spaced apart across the width of pallet truck 10.

Rigidly attached preferably as by welding respectively to the under surfaces of outer fork members 11 are substantially elongated guides 41, and similarly rigidly attached respectively to the under surfaces of fork members 12 are substantially elongated guides 43. Guides 41, 43 extend throughout the major portion of the length of fork members 11, 12 with which the guides are respectively related, terminating adjacent but spaced rearwardly from front tips 15 of the fork members. The rigid attachment of guides 41, 43 extends substantially throughout the length of the guides.

Guides 41 are attached to the respective under surfaces of fork members 11 closely adjacent the inner edges of fork members 11, with the inner edges of guides 41 substantially flush with the inner edges of fork members 11. The inner edges of the fork members and the guides form the outer boundary of the spaces 45 between the respective pairs of fork members 11, 12. Guides 43 are respectively attached to the under surfaces of fork members 12 closely adjacent the outer edges of fork members 12, with the outer edges of guides 43 substantially flush with the outer edges of fork members 12. The outer edges of fork members 12 and of guides 43 form the inner boundary of spaces 45 between fork members 11, 12.

The inner edges of guides 41 are bevelled as at 47 substantially throughout the length of guides 41. Bevels 47 extend upwardly and outwardly from the inner edges of guides 41 to the flat under surfaces of fork members 11, preferably at an angle of 30° to the fork member under surfaces. Thus an inner flat under surface portion of each fork member 11 adjacent its inner edge is exposed and overlies bevel 47. The exposed inner flat under surface portions of fork members 11 and bevels 47 cooperate to define guide grooves 48, extending along and below fork members 11. Grooves 48 are substantially V-shaped in cross-section and are inwardly open in communication with spaces 45.

In similar fashion but reversely arranged, the outer edges of guides 43 are bevelled as at 49 substantially throughout the length of guides 43. Bevels 49 extend upwardly and inwardly from the outer edges of guides 43 to the flat under surfaces of fork members 12, preferably at an angle of 30° to the fork member under surfaces, thus exposing outer portions of the under surfaces of fork members 12 adjacent their outer edges which portions overlie bevels 49. The exposed outer portions of fork members 12 and bevels 49 cooperate to define guide grooves 50 extending along and below fork members 12.

Grooves 50 are substantially V-shaped in cross-section and are outwardly open in communication with spaces 45.

Grooves 48 are respectively faced toward grooves 50. Grooves 48, 50 are parallel and are positioned at substantially the same level relative to fork members 11, 12, for guiding members to be inserted therein. It will be noted that while each fork member 11, 12 is thus provided with guide means, none of the fork members is interrupted by undercuts, apertures or otherwise, and they are maintained intact without weakening.

In each space 45, a slide plate 51 is reciprocably and slidably mounted. Each plate 51 includes an outer edge 52 and an inner edge 53, edges 52, 53 being respectively proximate to fork members 11, 12. Plate outer edges 52 are bevelled as at 54, bevels 54 extending downwardly and inwardly from the upper surfaces to the under surfaces of plates 51 at an angle of 30° to the plate upper surfaces. Plate inner edges 53 are bevelled as at 55, bevels 55 extending downwardly and outwardly from the upper surfaces to the under surfaces of plates 51 at an angle of 30° to the plate upper surfaces. Plates 51 span spaces 45 with bevels 54, 55 extending beyond spaces 45 and inserted respectively into guide grooves 48, 50. Bevels 54, 55 are slidably shiftable forward and rearward along grooves 48, 50. The mating interengagement of bevels 54, 55 with grooves 48, 50 effectively prevents any relative vertical movement between plates 51 and fork members 11, 12.

For effecting sliding shift of plates 51 along spaces 45, each plate is provided with a clevis 57, rigidly attached to the rear portion of the plate substantially centrally between plate edges 52, 53 and projecting rearwardly therefrom. To each clevis 57, a rearwardly projecting piston rod 59 is detachably connected. Piston rods 59 are actuated respectively by hydraulic cylinders 61, attached to the base plate of pallet truck 10 as by the strap means 63. The rearmost portions of cylinders 61 extend rearwardly through the base skirt 17 and are additionally supported thereby. Hydraulic cylinders 61 are provided with hose means 65, 67 to carry hydraulic fluid from and to a reservoir (not shown) into and away from hydraulic cylinders 61 to extend and retract piston rods 59 so as to advance and retract plates 51 along guide grooves 48, 50.

A pair of substantially ringlike straps 69 are rigidly connected to the front portion of each plate 51 in spaced relation and extend forwardly of plates 51, strap rings 69 being provided with tab means 70, 71 extending rearwardly from the rings into rigid attachment with the upper and lower surfaces of plates 51. It will be noted that not only are strap rings 69 supported forwardly of plates 51, but also are supported so that the axial center lines of the strap rings are below the level of plates 51. Embraced in each strap ring 69 is a bearing 73, which is engaged and retained by its related strap ring.

A shaft 75 is journalled in each pair of strap rings 69 with the axial center lines of shafts 75 coinciding with the axial center lines of the strap rings, supporting shafts 75 forwardly of and downwardly offset below plates 51. A cylindrical roller 77 is fixed to each shaft 75 and spans between strap rings 69. Rollers 77 are supported upon the downwardly offset shafts in position so that the uppermost extent of the rollers is below the upper surfaces of fork members 11, 12, eliminating any interference with materials loaded on fork members 11, 12, 13. In addition the lowermost extent of rollers 77 extends downwardly below the lower edges of the fork members, enabling the rollers on shift to be moved into ground contact below the fork members. If desired, strap rings 69 may be provided with set screws 79 to maintain bearings 73 within the strap rings.

Material M is stacked as desired, for example in a warehouse, preferably overlying and seating upon a slip sheet 80. When it is desired to move material M, pallet truck 10, with wheels 27, 29 in floor or surface contact, is advanced toward material M until front fork member tips 15 are inserted beneath a portion of the material, a minor forward portion of fork members 11, 12, 13 being projected beneath material M. Wheels 27, 29 are elevated to lower base 17 of truck 10 into floor contact, substantially anchoring the truck against undesired movement.

As conventional warehouse pallets are elminiated, effecting saving of space, material M to be loaded upon the fork members of pallet truck 10 must be loaded from the floor or ground surface. Grabbing means 31 are moved forwardly over the fork members by hydraulic means (not shown) until jaw members 37, 39 contact slip sheet 80 below material M and upper jaw 37 is hydraulically actuated to bitingly engage jaws 37, 39 with slip sheet 80. Material M may then be moved upon the fork members by retracting grabbing means 31 into full retracted position as illustrated in FIG. 1. It will be seen that the positioning of rollers 77 below the level of the upper fork member surfaces avoids any obstruction to the movement of material M along such fork member surfaces.

Following loading of material M upon fork members 11, 12, 13, rollers 77 are advanced along the downwardly sloping guide grooves 48, 50 into ground contact. Advance rollers 77, relative to guide grooves 48, 50, is effected by shift of piston rods 59, actuated by hydraulic cylinders 61. Plates 51, to which piston rods 59 are fixed, are forced forwardly, carrying rollers 77 supported by plates 51 forwardly therewith. The sliding inter-engagement of plate bevels 54, 55, with guide grooves 48, 50, effects guiding maintenance of the forward movement of plates 51 and rollers 77 along the sloping path toward ground contact and prevents any vertical deviation therefrom.

After rollers 77 have reached ground contact roller advance is continued toward fork member tips 15, terminating with rollers 77 spaced rearwardly of the tips substantially at the terminals of guide grooves 48, 50, and substantially at the limit of piston rods 59 extension from cylinders 61. During this continuation of the roller advance, the rollers are driven along ground contact but at an angle (the angle of guide groove slope) relative to fork members 11, 12, thus forcing such fork members and material M loaded thereon upwardly until front tips 15 are out of ground contact, clear of and spaced from the floor or other surface. The weight of loaded material M and the fork members is thus shifted over rollers 77 and is supported by the rollers. Pallet truck wheels 27, 29 are then lowered to raise truck skirt 17 free of ground contact effecting mobility of pallet truck 10 for transporting material M loaded thereupon to a selected location.

It will thus be readily seen that in the use of the invention, material stacked and stored in a warehouse or the like may be lifted from the floor or ground thereof directly upon the fork members of a device such as a pallet truck eliminating the use of space occupying pallets. Further the mobility and ease of handling pallet trucks loaded with material is greatly improved.

It will be understood that while the preferred practice in loading material onto the fork members has been described, the material may be introduced onto the fork members by other practices without departing herefrom.

The present invention may be suitably adapted for use with fork members carried by warehouse lift trucks and similar devices without departing from the scope and spirit of the invention.

What is claimed is:
1. In a pallet truck having a plurality of fork members projecting forwardly from said truck for supporting material loaded thereon, means for lifting the forward ends of said fork members out of surface contact and supporting said fork members and said loaded material comprising
(A) said fork members
  (1) having upper load supporting surfaces sloping downwardly and forwardly away from said truck,
  (2) being uniformly spaced apart transversely of said truck, and
  (3) tapering away from said truck, terminating in thin front tips,
(B) guide means carried by said fork members,
  (1) said guide means extending throughout the majority of the length and along the under surfaces of said fork members,
  (2) guides, forming part of said guide means, substantially coextensive in length with said guide means,
    (a) rigidly fixed to said fork member under surfaces,
    (b) an edge of each guide being undercut adjacent to its related said fork member under surface,
    (c) said guide undercut cooperating with said under surface forming an open groove in communication with the adjacent space between fork members, each said space having oppositely facing said grooves respectively in communication with said space,
(C) slide plates respectively slidably and reciprocably mounted in said spaces, said slide plates including side edges respectively slidably inserted in said grooves with each said slide plate spanning the said space in which it is mounted,
(D) rollers connected to said slide plates,
  (1) means rigidly attached to and carried by the forward part of said plates,
  (2) said rollers being rotatably supported in said means forwardly of said plates,
  (3) said rollers depending below the under surface of said fork members and guide means,
(E) and means for advancing and retracting said plates and rollers along said fork members, comprising
  (1) piston rods rigidly connected to the rearward portion of said plates,
  (2) hydraulic means connected to said piston rods for effecting advance and retraction of said plates and rollers, advance of said plates and rollers
    (a) moving said rollers into ground contact,
    (b) forcing said fork members and loaded material upwardly out of ground contact,
    (c) said advance moving said rollers into position underlying said material in which said rollers support the weight of said material.

2. Apparatus in accordance with claim 1, in which said guide means terminate rearwardly of said fork member front tips.

3. Apparatus in accordance with claim 1, in which
(A) said guide edge undercuts comprise upwardly facing bevels, and
(B) said grooves are substantially V-shaped in cross-section.

4. Apparatus in accordance with claim 3, in which said bevels are formed at an angle of substantially 30° relative to said fork member under surfaces.

5. Apparatus in accordance with claim 1, in which said plate edges and said grooves interact to limit relative vertical movement between said plates and said fork members.

6. Apparatus in accordance with claim 1, in which said plate side edges are bevelled forming downwardly facing plate edge bevels.

7. Apparatus in accordance with claim 6, in which said plate edge bevels are formed at an angle of substantially 30° relative to the upper surfaces of said plate.

8. Apparatus in accordance with claim 1, in which said rollers are supported with the cylindrical surfaces of said rollers below the level of said fork member upper surfaces.

9. Apparatus in accordance with claim 3, in which
 (A) said plate side edges are bevelled forming downwardly facing plate edge bevels, and
 (B) said plate edge bevels slidably engage said guide edge upwardly facing bevels.

10. Apparatus in accordance with claim 9, in which
 (A) said plate side edge bevels are formed at an angle of substantially 30° relative to the upper surfaces of said plates, and
 (B) said guide edge bevels are formed at an angle of substantially 30° relative to said fork member under surfaces.

References Cited
UNITED STATES PATENTS

| | | | |
|---|---|---|---|
| 2,619,241 | 11/1952 | Jessen | 214—514 |
| 3,381,834 | 5/1968 | Gibson | 214—514 |

ALBERT J. MAKAY, Primary Examiner

U.S. Cl. X.R.

214—514, 750